(12) United States Patent
Rousse et al.

(10) Patent No.: US 11,444,965 B2
(45) Date of Patent: Sep. 13, 2022

(54) METHOD AND SYSTEM FOR SECURING AN AIRCRAFT AGAINST CYBERATTACKS

(71) Applicant: Airbus (S.A.S.), Blagnac (FR)

(72) Inventors: Bernard Rousse, Blagnac (FR); Claude Poli, Blagnac (FR)

(73) Assignee: Airbus (S.A.S.), Blagnac (FR)

( * ) Notice: Subject to any disclaimer, the term of this patent is extended or adjusted under 35 U.S.C. 154(b) by 337 days.

(21) Appl. No.: 16/686,880

(22) Filed: Nov. 18, 2019

(65) Prior Publication Data
US 2020/0169578 A1 May 28, 2020

(30) Foreign Application Priority Data

Nov. 23, 2018 (FR) ...................................... 1871776

(51) Int. Cl.
*H04L 9/40* (2022.01)
*G06F 21/55* (2013.01)
(Continued)

(52) U.S. Cl.
CPC ............ *H04L 63/1425* (2013.01); *B64F 5/60* (2017.01); *G06F 21/554* (2013.01); *H04L 43/08* (2013.01); *G06F 2221/033* (2013.01)

(58) Field of Classification Search
CPC . H04L 63/1425; H04L 43/08; H04L 63/1433; H04L 63/1408; H04L 63/14;
(Continued)

(56) References Cited

U.S. PATENT DOCUMENTS 10,169,135 B1 * 1/2019 Pandey ............... G05B 23/0283
2010/0211609 A1 * 8/2010 Xiong ................. G06F 16/3344
707/E17.001

(Continued)

FOREIGN PATENT DOCUMENTS

GB 2 491 237 A 11/2012

OTHER PUBLICATIONS

Duman et al., "Measuring the security posture of IEC 61850 substations with redundancy against zero day attacks," 2017 IEEE International Conference on Smart Grid Communications (SmartGridComm) Year: 2017 | Conference Paper | Publisher: IEEE.*

(Continued)

*Primary Examiner* — Roderick Tolentino
(74) *Attorney, Agent, or Firm* — Jenkins, Wilson, Taylor & Hunt, PA (57) ABSTRACT

Methods and systems for detection of cyberattacks in onboard systems of aircraft. Measurements carried out on these onboard systems are correlated, in case of doubt of one of the measurements, to validate the doubt, (and therefore a cyberattack) or to avert the risk. The correlation can be understood as a coming into correspondence of two or more elements/facts (for example measurements or acquired values) which makes it possible to highlight if there is a dependence of one upon the other and thus to justify modifications of one by those of the other. The correlation, preferably temporal, between identification of a suspect measurement and one or more other (quasi)simultaneous measurements allows dynamic detection, in real time, of the cyberattacks, whether they be already known or not. Thus, there is no dependence on a static protection of the onboard systems developed on the a priori knowledge of the existing cyberattacks alone.

9 Claims, 4 Drawing Sheets

(51) Int. Cl.
   *B64F 5/60*     (2017.01)
   *H04L 43/08*    (2022.01)
(58) Field of Classification Search
   CPC ...... H04L 63/145; H04L 63/1458; B64F 5/60; G06F 21/554; G06F 2221/033; H04W 4/38; H04W 12/122
   See application file for complete search history.

(56) References Cited

U.S. PATENT DOCUMENTS

| | | | |
|---|---|---|---|
| 2016/0065603 A1 | 3/2016 | Dekel et al. | |
| 2017/0041331 A1 | 2/2017 | Craig et al. | |
| 2017/0230385 A1* | 8/2017 | Ruvio | H04W 12/12 |
| 2017/0345318 A1* | 11/2017 | Kim | B64D 45/00 |
| 2018/0196142 A1* | 7/2018 | Levy | G01S 19/215 |
| 2018/0322765 A1* | 11/2018 | Tappan | G06F 11/00 |
| 2019/0079826 A1* | 3/2019 | Gianisis | G05B 9/03 |
| 2019/0081734 A1* | 3/2019 | Monnier | H04L 1/0061 |
| 2019/0267926 A1* | 8/2019 | Tsubaki | B62D 5/04 |
| 2019/0354629 A1* | 11/2019 | Zavesky | G06N 3/08 |

OTHER PUBLICATIONS

Maciel et al., "Impact of a DDoS attack on computer systems: An approach based on an attack tree model," 2018 Annual IEEE International Systems Conference (SysCon) Year: 2018 | Conference Paper | Publisher: IEEE.*

French Search Report for Application No. 1871776 dated Jul. 4, 2019.

* cited by examiner

| #1 | param 1 | 1 | #8 #12 |
| --- | --- | --- | --- |
| #2 | altitude | 1 | #11 #12 #18 #20 |
| #3 | param 3 | 0 | |
| ... | | ... | |
| #11 | Position of throttle control | 0 | |
| #12 | Engine thrust | 1 | #15 #30 |
| ... | | ... | |

METHOD AND SYSTEM FOR SECURING AN AIRCRAFT AGAINST CYBERATTACKS

CROSS-REFERENCE TO RELATED APPLICATION

This application claims priority to French patent application number 1871776, filed on Nov. 23, 2018, the entire disclosure of which is incorporated by reference herein.

TECHNICAL FIELD

The disclosure herein relates to the aeronautical field, and more particularly to the safety of onboard systems in an aircraft, for example an airplane.

BACKGROUND

Aircraft, typically airplanes, comprise increasingly sophisticated onboard systems. An onboard system generally comprises several electronic and data processing subsystems interconnected with each other by one or more communication networks, these subsystems being able to be duplicated for purposes of redundancy. The subsystems include for example onboard computers, network links, data processing units, etc.

The onboard systems generally operate in real time for air navigation purposes, for example in order to carry out a flight in safety.

They could however be subject to cyberattacks, that is to say voluntary, offensive or hostile actions, carried out through data processing networks and intended to cause damage to these onboard systems and to the information that they contain and process.

In order to guard against these cyberattacks, protections are provided in the onboard aircraft systems. These are principally various software or hardware layers added to the subsystems, layers which prevent, like shields, the threats from affecting these subsystems.

This approach is static insofar as the threats dealt with by these layers are known in advance. Its adaptation to new threats requires the continuous monitoring and studying of all activity in the onboard system in order to detect new threats (new types of cyberattacks). Then, new and sometimes costly developments must therefore be carried out in order to adapt these layers of protection to the detected new threats.

It would be desirable to improve this situation.

SUMMARY

In this context, the subject matter herein discloses a new method for securing an onboard system in an aircraft against cyberattacks. The method comprises the following steps:
measuring at least a first parameter in the onboard system;
detecting an abnormal measurement of the first parameter;
determining a correlation between the abnormal measurement of the first parameter and the value of at least a second avionic parameter, in order to identify a cyberattack;
initiating a corrective action in the aircraft as a function of the determined correlation.

The corrective action notably takes place when the result of the correlation indicates a cyberattack. Preferably, no action is taken in the opposite case.

The disclosure herein thus proposes to correlate a measurement taken in the airplane and identified as being suspect with another avionic parameter, for the purpose of identifying a cyberattack (and thus to initiate a corrective action). The other avionic parameter can be available in the airplane without measurement or it can be measured by a probe or a sensor. This correlation advantageously makes it possible to base the detection of cyberattacks on simple acquisitions of parameters, without providing specific protection developments in the items of hardware. It allows, moreover, a dynamic adaptability to unanticipated erroneous measurements (that is to say not yet envisioned cyberattacks).

Correlatively, the disclosure herein also proposes a system for securing an onboard system in an aircraft against cyberattacks having advantages similar to those of the method. The system comprises:
one or more probes for measuring at least a first parameter in the onboard system;
a processor for detecting an abnormal measurement of the first parameter;
a correlation processor configured for determining a correlation between the abnormal measurement of the first parameter and the value of at least a second avionic parameter in order to identify a cyberattack;
a reaction module configured for initiating a corrective action in the aircraft as a function of the determined correlation.

The corrective action can comprise a simple warning signal for the attention of the crew, and/or one or more countermeasures to the detected cyberattack. The countermeasures can be predefined according to the first compromised parameter, and/or they can be adapted according to the importance of the attack (for example the size of a shift in the abnormal measurement with respect to a reference value such as a prior value of the first parameter).

The subject matter herein also discloses an aircraft comprising an onboard system and a system for securing the onboard system.

Optionally the method and the system can comprise features relative to different embodiments such as described below.

In one embodiment, the correlation is representative of a temporal correlation between the detection of the abnormal measurement of the first parameter and a modification of the second parameter. By this, it is sought to evaluate the correlation between the appearance of the abnormal measurement and the existence of an action by the crew (by the modification of another parameter). A strong correlation in fact indicates that the abnormal measurement is desired, and does not therefore result from a cyberattack, contrary to a weak or even non-existent correlation.

In a particular embodiment, determining a correlation comprises the comparison of a measurement of the second parameter at the time of detection of the abnormal measurement with another measurement of the second parameter at at least one preceding time. This comparison makes it possible to confirm the existence of a modification of the second parameter, and therefore possibly of an action by the crew. This approach can be repeated for several "second" parameters which would be associated with the parameter measured as being abnormal.

In one embodiment of the disclosure herein, the step of detection of an abnormal measurement of the first parameter comprises the determination of a suspect measurement of the first parameter in a first onboard system, then the comparison of the suspect measurement with a measurement of the same first parameter in an onboard system redundant with the first onboard system. This configuration makes it possible to set aside suspect measurements which definitively result from a failure or breakdown of the monitored equipment.

In one embodiment, the steps of measuring, detecting, determining and initiating are carried out on board the aircraft. This configuration thus proposes an autonomous securing of aircraft against cyberattacks.

In another embodiment, the abnormal measurement of the first parameter and the value (preferably the measurement) of at least a second parameter are transmitted from the aircraft to a ground station, the step of determination of a correlation being carried out by the ground station. A larger number of measurements/values is of course generally transmitted, making it possible to analyse several hazardous abnormal or suspect measurements. Optionally, it can be envisioned to limit the quantity of information transmitted, for example only the abnormal measurements and the available measurements or values corresponding to the reference parameters (in this case the at least a second parameter) associated with the first parameter to allow the evaluation of the correlation.

According to a particular feature, the aircraft receives, from the ground station, a corrective action to be initiated.

According to another particular feature, the step of determination of a correlation comprises, moreover, the correlation of the abnormal measurement of the first parameter with a datum obtained from at least one other aircraft. The ground station thus makes it possible to take account of a fleet of aircraft in order to evaluate the risks of cyberattack.

BRIEF DESCRIPTION OF DRAWINGS

Other features and advantages of the disclosure herein will furthermore appear in the following description, illustrated by the appended drawings.

DETAILED DESCRIPTION

The disclosure herein provides methods and systems for the detection of cyberattacks in onboard aircraft systems. As will be disclosed in the following description, measurements carried out on these onboard systems can be correlated in the case of doubt of one of the measurements, in order to validate the doubt (and therefore a cyberattack) or to avert the risk. The correlation can be understood as a coming into correspondence of two or more elements/facts (for example measurements and values available in the airplane) which makes it possible to highlight if there is a dependence of one upon the other and thus to justify the modifications of one by those of the other.

The correlation, preferably temporal, between the identification of a suspect measurement and one or more other (quasi)simultaneous measurements (or one or more values available in the airplane for correlation parameters) allows dynamic detection, in real time, of all of the cyberattacks, whether they be already known or not. Thus, there is no dependence on a static protection of the onboard systems developed on the a priori knowledge of the existing cyberattacks alone.

Figure 1:
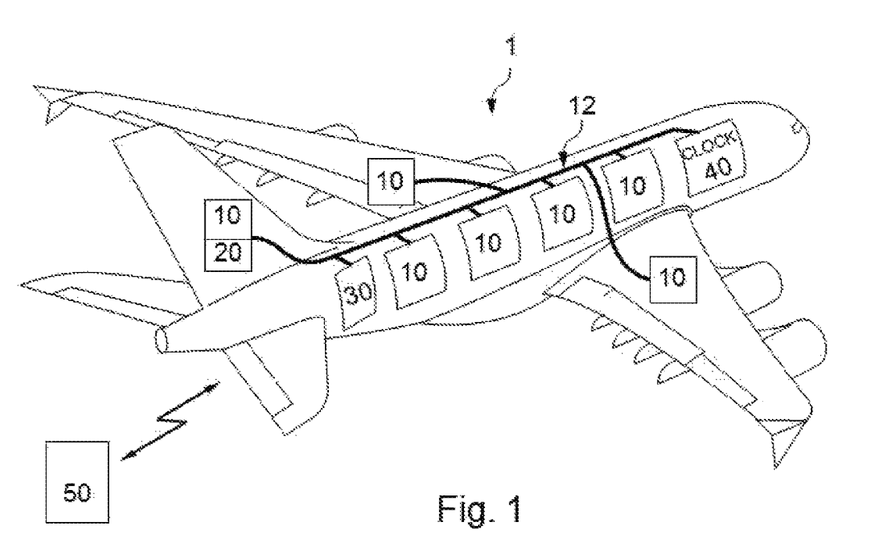
FIG. 1 is a diagrammatic illustration of a conventional aircraft provided with a plurality of onboard systems.

FIG. 1 is a diagrammatic illustration of an aircraft 1 comprising a multitude of onboard systems or devices 10, for example mechanical, electrical or hydraulic systems such as pumps, computers, measuring instruments, automatic pilots, cabin equipment, etc. Modern airplanes have several thousands of such onboard systems generally connected to one or more communication networks 12.

Figure 1A:
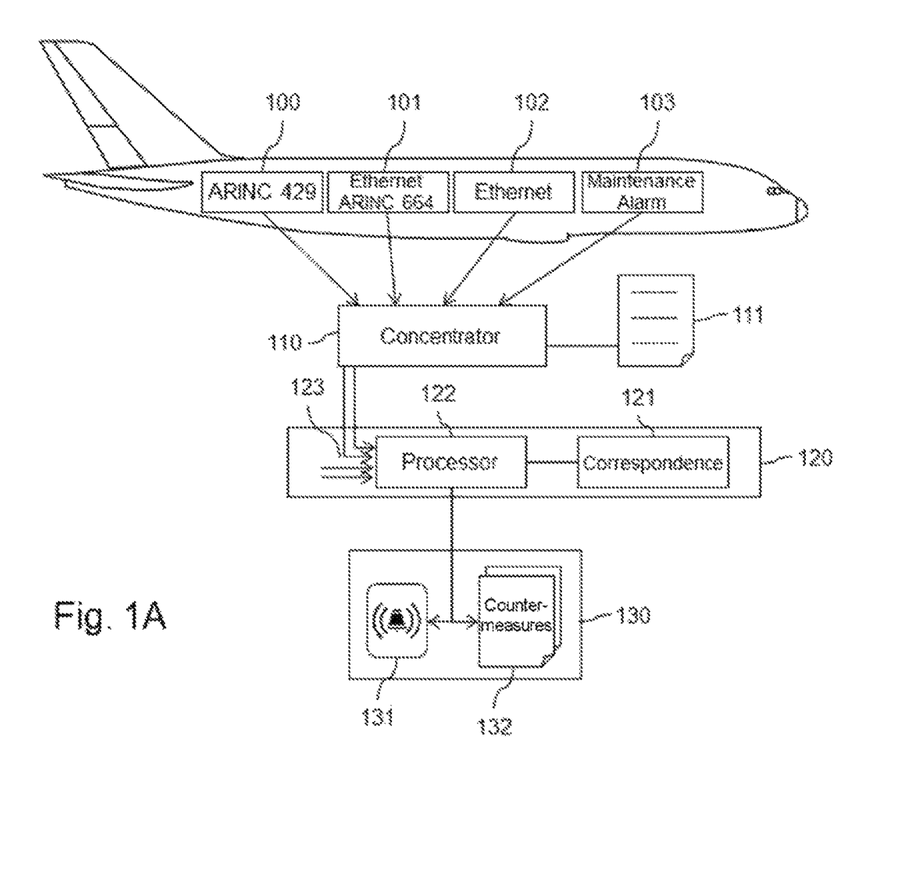
FIG. 1A is a diagrammatic illustration of an aircraft provided with a plurality of onboard systems and with a monitoring system according to embodiments of the disclosure herein.

For ease of language, "onboard system" refers to the set of these items of equipment and networks constituting a coherent electronic and data processing assembly of the aircraft. The onboard system can depend on a single communication network. However, several communication networks generally coexist, defining corresponding onboard subsystems, connected with each other (that is to say interconnected) by dedicated items of hardware, such as switches or hubs. FIG. 1A shows an example of four subsystems:

a first subsystem 100 based on an avionic network of the ARINC 429 (version 429-18 dated 2012) type for connecting a first set of avionic equipment;

a second subsystem 101 based on a deterministic switched Ethernet network using virtual links, for example conforming to the ARINC 664 part 7 standard, for connecting a second set of avionic equipment;

a third subsystem 102 based on a conventional Ethernet network for connecting another set of equipment of the aircraft;

a fourth proprietary subsystem 103 connecting a set of equipment carrying out maintenance and alarm functions of the aircraft.

These four subsystems are of course described here by way of illustration only. The aircraft can comprise another number of subsystems based on networks of different natures, or can even comprise two or more subsystems based on a same type of communication network. Optionally, one or more of these subsystems can be isolated (without interconnection) from the other subsystems of the aircraft.

For securing purposes, the onboard equipment and corresponding subsystems are duplicated in order to provide redundancy of the avionic functions.

In order to carry out a monitoring of cyberattacks according to the disclosure herein, probes are provided in the onboard system which measure various parameters. Certain parameters can be available in the aircraft, for example in memory, without having been measured.

The probes can be integrated in the onboard equipment and can send back operating parameters of this equipment.

As a variant, these probes can be used in monitoring modules 20 dedicated to precise items of equipment. These monitoring modules or "BiTE" (standing for "Built-in Test Equipment") are generally used in diagnostic and passive fault management tools.

Still as a variant, probes 30 can be added at various locations of the onboard system. For example, probes for monitoring the communication networks make it possible to monitor the data frames transmitted in the networks and thus to sample and send back the values of certain data or of certain parameters. One probe can monitor several parameters at the same time, or even several different subsystems (or networks) if it is installed for example on a switch interconnecting these subsystems.

The use of such added probes 30 has the advantage of easily allowing a reconfiguration, as well as that of being able to access a very large number of data/parameters.

By way of example, the altitude provided by an onboard radio-altimeter can be monitored.

An onboard system will of course generally accommodate integrated probes, BiTE probes 20 and monitoring probes 30 at the same time, even if one of these types of probes can be omitted. The probes generally comprise sensors dedicated to the acquisition of measurements of monitored parameters as well as to additional functions such as filtering in order to send back only the measurements of interest.

A choice of items of equipment and parameters to be monitored can be defined during the design of the aircraft, after a risk analysis.

Monitoring all of the items of equipment and all of the parameters would be ideal but highly consuming of processing resources. Also, it is preferably limited to equipment/functions that are useful, or even essential, to the accomplishment of the mission (generally a flight).

The choice of equipment/parameters can for example be based on an analysis of the consequences that could result from a failure/error of or in those equipment/parameters. Numerous items of equipment should be targeted in an aircraft.

In order to reduce this number, the choice can be made according to safety risks, that is to say according to a ratio (for example a percentage) between those same consequences and a potential of risk of occurrence of the failures/errors.

Other criteria to be taken into account make it possible to extend the field of the monitoring beyond the known cyberattacks. A safety analysis (potential wounded persons, potential damage caused on the aircraft or on a subsystem) and/or an operational analysis (potential impact on the availability of the aircraft/subsystem to be carried out in due time for the affected mission) and/or an analysis of awareness (potential impact on the image perceived by the user) are some examples making it possible to identify new pertinent items of equipment/parameters.

The onboard system optionally comprises a clock 40 making it possible to timestamp each measurement made by the probes. A temporal correlation of the different measurements made is thereby simplified.

As shown diagrammatically in FIG. 1A, the monitoring system according to embodiments of the disclosure herein comprises, moreover, a concentrator 110, a correlation module 120 and a reaction module 130.

The concentrator 110 is connected to the probes disposed in the aircraft. It receives all of the measurements made by these probes.

Certain probes (for example BiTE) can only transmit signals in the case of anomaly (failure or error), in this case possibly accompanied by the abnormal value of the corresponding parameters. Other probes can transmit the current value of parameters. Yet other probes can transmit both anomaly signals and possibly the abnormal value of the corresponding parameter, as well as the current value of other parameters. In the examples below, the anomaly signals thus obtained are suspect measurements, which could be the result of a cyberattack. The other parameters for which a current value is measured can be used for correlation with the suspect measurements, in order to identify a cyberattack or not.

A large number of measurements is thus obtained by the concentrator 110. The latter can therefore contain filtering functions in order to reduce the number of measurements used by the correlation module 120.

The concentrator 110 can be parameterized by a configuration file 111 in memory, in order to determine the measurements to be acquired (from such-and-such a probe) as well as the measurements to be transmitted to the correlation module 120, notwithstanding the mentioned filtering. The configuration file can notably be updated in real time, for example by the ground station 50, in order to adapt the monitoring system dynamically to the identification of a new cyber-threat. The acquisition and transmission rules of the concentrator 110 are then updated in response to this updating of the file 111.

The correlation module 120 comprises a correspondence or association module 121, a correlation processor 122 and a set of measurements or values 123 of parameters forming the correlation parameters. The measurements 123 can notably come from the concentrator 110 and thus correspond to the measurements acquired by the abovementioned probes. The unmeasured values of parameters can be retrieved from onboard memory or acquired by the module 120 via a communication network of the aircraft, for example at least one of the networks 100, 101, 102, 103.

Each measurement is timestamped when it is acquired, by the clock 40, in order to allow a temporal correlation of measurements made in the onboard system.

The correspondence module 121 associates a first parameter with one or more other respective parameters. This module is notably used for knowing the parameters to be correlated with the first parameter when the latter is considered as suspect or abnormal, and therefore which may have resulted from a cyberattack.

In one embodiment, the correspondence module 121 consists of or comprises a simple correspondence table which associates with one or more parameters ("first parameter") one or more other respective correlation parameters. However, the disclosure herein is not limited to a simple table for the correspondence module 121. In one embodiment, the correspondence module can correspond to a database comprising a large number of parameters as well as rules of association between these parameters.

Figure 2:
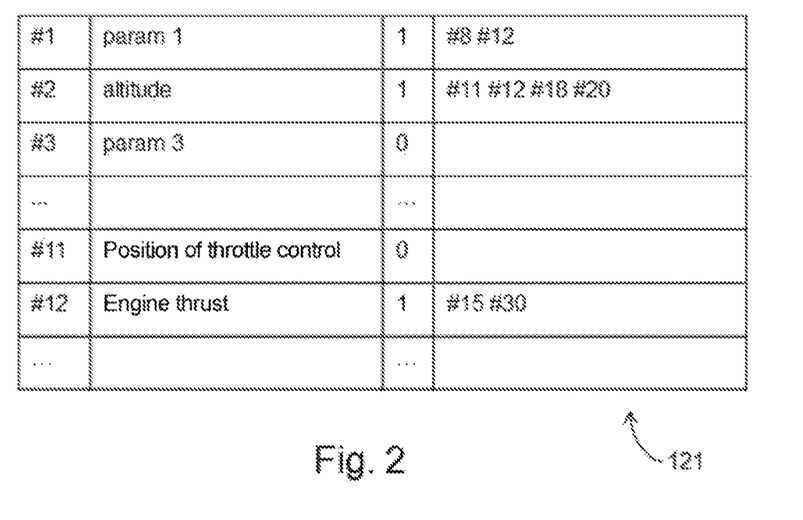
FIG. 2 shows an example of a correspondence table associating suspect parameters with correlation parameters according to one embodiment of the disclosure herein.

The example shown in FIG. 2 comprises a table 121 listing all of the measured and acquired parameters, for example those listed in the configuration file 111. For this purpose, the file 111 and the table 121 can be one and the same table.

The first column comprises a unique index identifying each entry in the table. The entry indicates (second column) the parameter in question and specifies (fourth column) the other correlation parameters. For example, the parameter #1 identified as "param 1" presents the parameters #8 and #12 as correlation parameters.

Referring again to the above example, the altitude (parameter #2) provided by the radio-altimeter presents, by way of illustration, the following correlation parameters: position of the throttle control (for example parameter #11), engine thrust (#12), position of the flaps (#18), position of the trim tabs (#20).

The table can also comprise an indicator, typically a bit (third column) indicating which "first parameters" are likely to initiate an analysis of correlation with measurements of the parameters in the fourth column. This indicator notably makes it possible for the concentrator to apply certain filterings (as described below) in order to identify these the first parameters ("1" in the figure). Also, the rows with the indicator at "0" do not have any parameters indicated in the fourth column. The parameters of these rows are declared here (for example so that they may be measured and acquired from the probes) but only used for carrying out a correlation with "first parameters" which are indicated in the fourth column.

The correlation processor 122 is able to carry out a correlation between a suspect measurement of a parameter and an acquired value or measurement of the parameter or parameters associated with the suspect parameter as defined in the correspondence module 121. For this purpose, it receives the suspect measurement corresponding to a current time "t" and correlates this measurement with preferably one or more acquired or measured values of other parameters at the same time, possibly retrieved from the concentrator 110. It is therefore a temporal correlation.

Notably, the processor 122 seeks to correlate, in a temporal manner, the suspect measurement with a time of modification of one or more other pertinent (that is to say associated as defined in the correspondence module 121) parameters. Thus, the processor 122 compares for example the acquired values or measurements of these other parameters between the time "t" and a preceding time, for example "t-1" ("-1" representing the preceding time of acquisition either by the probe, or by the concentrator 110, or by the module 120). Times other than "t-1" can of course be used, notably "t-2" or any time in a predefined past interval, for example 1 second.

The correlation can be carried out using the measurement of just one of the parameters associated with the suspect parameter. As a variant, several associated parameters, or even all of them, are used for confirming the correlation between the suspect measurement and the modification of several conditions (other parameters) in the aircraft.

On the basis of the result of the correlation (for each suspect parameter examined), the correlation processor 122 can generate a reaction signal to be sent to the reaction module 130.

A positive correlation which confirms that the suspect measurement corresponds, for example temporally, to a modification of other parameters tends to show that the suspect measurement is explained by this modification (which is for example an action by the crew on the aircraft). In this case, no reaction signal is necessary and therefore generated.

A negative correlation indicates, on the contrary, that the suspect measurement does not correspond temporally to an intervention by the crew on the aircraft. It is a matter of a cyberattack. In this case, the reaction signal can be generated by the processor 122. The reaction signal can notably identify (by using the identifier in the first column of the table 121 for example) the parameter involved in the detected cyberattack.

As a variant to the simple correspondence table of the correspondence module 121, the correlation module 120 and the concentrator 110 can include self-learning capabilities (for example based on neural networks) in order to refine the models correlating a parameter likely to be cyberattacked with other measured parameters. These self-learning capabilities notably allow not only an initial configuration by learning on the basis of a set of situations already encountered for which a cyberattack has finally been diagnosed, but also a dynamic updating as new cyberattacks are detected in the same aircraft or in another aircraft of a fleet managed by the ground station (in this case, the data allowing the self-learning are sent from the ground station to the aircraft).

The reaction module 130 can comprise a processor 131 of warnings to be sent to the crew and a countermeasures processor 132.

The warnings processor 131 can generate, on the basis of the received reaction signal, a warning of the audible or visual type in order to warn the crew. The sound or the display (text, light, etc.) can be a function of the parameter compromised by the cyberattack (such as identified in the reaction signal).

The countermeasures processor 132 can implement, in response to the reaction signal, a set of predefined measures (for example in memory) aimed at containing the cyberattack in order not to contaminate other parameters/equipment and/or attenuating or correcting the effects of the compromised parameter on the other parameters/equipment. It can be simply a matter of countermeasures instructions indicated to the crew for implementation.

The probes, concentrator 110, correlation module 120 and reaction module 130 are preferably integrated in the aircraft, making it possible for the aircraft to be fully autonomous in the detection and management of cyberattacks.

Advantageously, the ground station 50 comprises a ground correlation module. In this case, the aircraft 1 and the ground station are provided with conventional communication devices for transmission of the measurements made or values acquired (from the aircraft to the ground station) and the possible reaction signals (from the ground station to the aircraft), or even of updating information to the aircraft. Alternatively, the measurements made/values acquired and the possible reaction signals are transmitted by a physical medium, for example a USB stick, when the aircraft is on the ground.

The measurements transmitted can be those acquired from the probes. As a variant, only the measurements filtered by the concentrator 110 and those of the parameters associated with the filtered measurements (and therefore considered as abnormal) are transmitted, limiting the quantity of measurements transmitted for each acquisition time, Unmeasured acquired values can also be transmitted.

The correlation module 120 makes it possible to detect a cyberattack on the basis of the parameters measured/acquired on board the aircraft, during the flight of the aircraft. The ground correlation module makes it possible to detect a cyberattack on the basis of parameters acquired by a set of aircraft managed by the ground station (parameters acquired in real time and/or parameters corresponding to a history of preceding flights of the aircraft).

When a cyberattack is detected by the ground correlation module, the ground station sends a reaction signal to the aircraft and/or to the set of aircraft managed by the ground station.

The various modules mentioned above can be implemented in a software manner and can be executed by one or more dedicated processors.

The executable code of each program/software product, allowing the securing system to use the method according to the disclosure herein, can be stored on a hard disk or in read-only memory or in any other suitable storage element.

A central processing unit or processor will control and manage the execution of the instructions or portions of software code from the program or programs according to the disclosure herein. When powering on, the program or programs which are stored in a non-volatile manner are transferred into a random access memory associated with the central processing unit or processor, the random access memory then containing the executable code of the program or programs according to the disclosure herein as well as registers for storing the variables and parameters necessary for the implementation of the disclosure herein.

Figure 3:
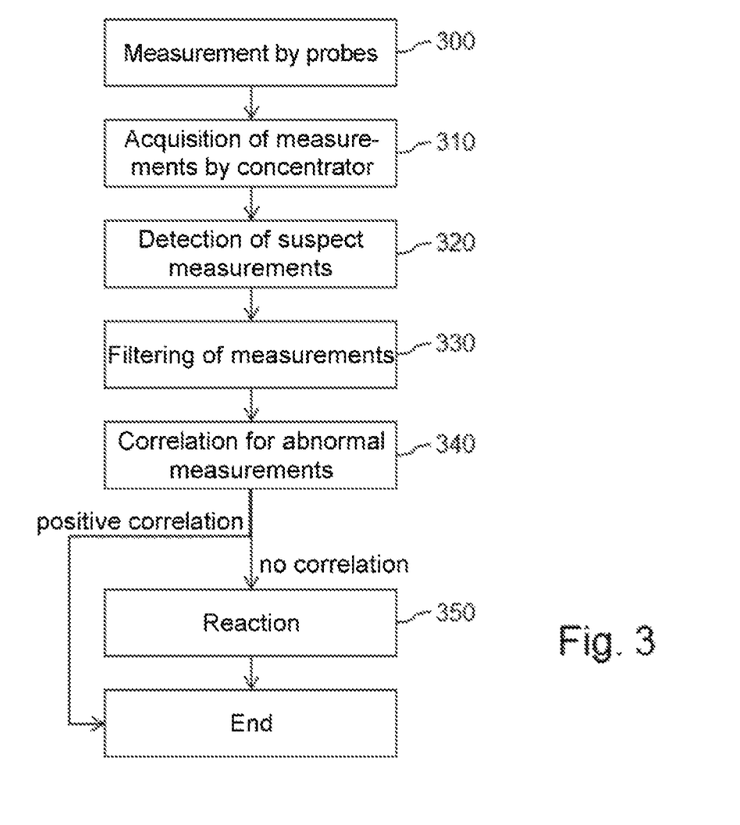
FIG. 3 shows general steps of an embodiment of the disclosure herein by a flow chart.

FIG. 3 shows the steps of a method for securing an onboard system, such as those shown in FIGS. 1 and 1A, against cyberattacks.

In step 300, the various probes placed in the aircraft continuously measure various operational parameters. The measurements are timestamped at each acquisition time.

Certain parameters can be acquired without measurement.

In the abovementioned example, a probe measures the altitude provided by an onboard radio-altimeter. The correlation parameters corresponding to the altitude, namely the position of the throttle control, the engine thrust (for example an indicator representing this thrust), the position of the flaps and the position of the trim tabs are for example parameters already available on board the aircraft, without measurement. These parameters are for example acquired by the correlation module 120 via a communication network of the aircraft, for example at least one of the networks 100, 101, 102, 103.

In step 310, the concentrator 110 continuously acquires all or some of the measurements. Preferably, the concentrator 110 acquires only the measurements of the measurable parameters indicated in the configuration file 111.

In step 320, the concentrator 110 detects one or more measurements that are suspect in the sense that they do not correspond to normal operational conditions. In order to do this, the concentrator 110 can have a databank giving it knowledge of the normal operating conditions (for example a range of possible values, a maximum speed of variation of the value, etc.), malfunction modes and other information for example of the data exchange protocol upon which the item of equipment monitored by the probe depends for communication with another item of equipment.

Preferably, the concentrator 110 can limit this step to the parameters for which the indicator (third column—FIG. 2) of the configuration file 111 (or any identical information) is activated ("1").

In the abovementioned example, the concentrator receives an altitude measurement, and identifies it as being suspect taking account of the normal operating conditions. For example, the altitude measurement is too different from a preceding measurement.

In the optional step 330, the concentrator 110 filters the suspect measurements in order to determine those likely to be the sign of a cyberattack. The number of suspect measurements to be correlated in the next step is reduced by this.

As a reminder, a suspect measurement measures a parameter corresponding to an onboard item of equipment/network. This item of equipment/network is duplicated in the aircraft for safety reasons. The filtering can therefore comprise the comparison of the suspect measurement with a measurement of the same parameter (at the same temporal moment or at a close time) in the redundant onboard system (redundant with the onboard system from which the suspect measurement comes).

Finally, if the two measurements (main and redundant) are different, a failure or breakdown of the main equipment can be suspected. On the other hand, if the two measurements are identical, a cyberattack can be suspected. The abnormal measurement thus identified is subjected to an analysis by correlation as described below.

In the abovementioned example, the suspect altitude measurement is compared with the altitude measurement at the same time coming from the redundant radio-altimeter. If the two altitude measurements are different, the main radio-altimeter is considered as faulty; if they are identical, the altitude measurement is abnormal.

Even though steps 320 and 330 in this example are carried out by the concentrator 110, embodiments provide for them to be carried out in the probes themselves. Typically, the BiTE monitoring modules sufficiently comprise resources for carrying out these processings. In this case, the concentrator can acquire only the abnormal measurements resulting from step 330 (and not those set aside because they are proven to relate to a failure or breakdown) as well as the conventional measurements which will be used in the correlation operations (typically those of the parameters whose indicator (third column—FIG. 2) of the configuration file 111 (or any identical information) is deactivated ("0")). Step 340 then takes place after steps 320 and 330.

Step 340 is initiated when an abnormal measurement is detected. The latter is transmitted to the correlation module 120, which identifies the associated correlation parameters, for example those given in column 4 of the table 121, and retrieves the measurements or the (acquired) values of these associated parameters.

The abnormal measurement at the time "t" is thus correlated with one or more measurements/values, at the time "t", of the associated parameters. Notably, the degree of correlation between the abnormal measurement and the values of the other parameters is determined.

The abnormal measurements are distinguished from the changes in values of measurements which result from an action by the crew. In order to separate the latter, the correlation can then comprise the following steps:

comparing a measurement at the time "t" of one of the associated parameters with a prior measurement (for example at "t-1") of the same associated parameter. This comparison makes it possible to know if the crew has carried out an action (which modifies that associated parameter). Several associated parameters can be examined. Moreover, instead of comparing measurements, values of these associated parameters acquired without measurement can be compared, in the case of difference between the two measurements or values (for example exceeding a threshold detection value), considering that the abnormal measurement is the result of an action by the crew (strong correlation between the abnormal measurement and the modification of an associated parameter). Otherwise, considering that the abnormal measurement is the result of a cyberattack (weak or even non-existent correlation).

In the abovementioned example, the position of the throttle control, the engine thrust (for example an indicator representing that thrust), the position of the flaps and the position of the trim tabs are the parameters associated with the abnormal altitude measurement ALT(t).

If the position of the throttle control MAN has changed significantly between "t-1" (or another recent prior time) and "t", there is a strong temporal correlation between the altitude measurement ALT(t) and a throttle control change. ALT(t) is then considered as being normal. No signal is sent back to the crew.

If MAN has not changed significantly, just as the other associated parameters have not changed significantly, the processor 122 does not determine a correlation between ALT(t) and any modification of the associated parameters: a cyberattack is then detected.

Step 350 is initiated when the reaction module 130 receives a reaction signal from the correlation processor 122, this signal following the detection of a cyberattack. In step 350, a warning signal is emitted in order to warn the crew, typically an audible or visual signal, and one or more countermeasures can be engaged. In particular, the onboard system can notably have the capability of reconfiguring itself automatically in order to attenuate or eliminate the identified cyber-threat.

In one embodiment, the correlation step 340 is carried out by the ground station 50 which receives the measurements and values from the aircraft and returns a reaction signal to it in the case of detection of a cyberattack on the basis of an abnormal measurement.

The use of the ground station 50 provides more resources for the processing of the measurements acquired on the aircraft or even on a fleet of aircraft.

It also makes it possible to use, for the correlation step 340, sources of measurements other than those of the aircraft in question, for example parameters retrieved from the whole fleet. This whole fleet can for example correspond to a set of similar aircraft belonging to an airline company (or a group of airline companies) making use of the ground station 50.

Another advantage of the use of the ground station 50 is the capability of the latter, when it detects a cyberattack, to be able to warn all the aircraft of the fleet of this risk, possibly with a new detection procedure and appropriate new countermeasures. Notably, the configuration file 111 and/or the correspondence module 121 can then be updated in order to reflect this new detection procedure (use of new parameters to be measured and/or filtered and/or correlated for example). As a variant, the ground station can indicate a precursory signal (which it will have been able to identify) of a cyberattack.

As presented and described above, the disclosure herein allows a dynamic detection of unknown cyberattacks. This improved detection allows better reactions. Moreover, the securing of the onboard systems is thereby improved.

In one embodiment, the disclosure herein can be combined with solutions that are already known, such as software layers or static (or passive) hardware layers added to the subsystems as shields against cyber-threats.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

The preceding examples are only embodiments of the disclosure herein, which is not limited to them.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A method for securing an onboard system in an aircraft against cyberattacks, the method comprising:
    measuring at least a first parameter in the onboard system;
    detecting an abnormal measurement of the first parameter;
    determining a correlation between the abnormal measurement of the first parameter and a value of at least a second avionic parameter to identify a cyberattack; and
    initiating a corrective action in the aircraft as a function of the determined correlation,
    wherein detecting the abnormal measurement of the first parameter prior to determining the correlation comprises:
    determining a suspect measurement of the first parameter in the onboard system;
    comparing the suspect measurement with a redundant measurement of the first parameter in a redundant onboard system at a same or approximate temporal moment, the redundant onboard system being an onboard system redundant with the onboard system;
    when the suspect measurement and the redundant measurement are different values, setting aside the suspect measurement from determining the correlation; and
    when the suspect measurement and the redundant measurement are equal values, retaining the suspect measurement for determining the correlation.

2. The method according to claim 1, wherein the correlation is representative of a temporal correlation between detection of the abnormal measurement of the first parameter and a modification of the second avionic parameter.

3. The method according to claim 2, wherein determining the correlation comprises comparing a measurement of the second avionic parameter, at a time of detection of the abnormal measurement, with another measurement of the second avionic parameter at least at one preceding time.

4. The method according to claim 1, wherein steps of measuring, detecting, determining, and initiating are carried out on board the aircraft.

5. The method according to claim 1, wherein:
    the abnormal measurement of the first parameter and the value of at least the second avionic parameter are transmitted from the aircraft to a ground station; and
    determining the correlation is carried out by the ground station.

6. The method according to claim 5, wherein the aircraft receives, from the ground station, the corrective action to be initiated.

7. The method according to claim 5, wherein determining the correlation comprises correlating the abnormal measurement of the first parameter with a datum obtained from at least one other aircraft.

8. A system for securing an onboard system in an aircraft against cyberattacks, the system comprising:
    one or more probes for measuring at least a first parameter in the onboard system;
    a memory;
    a processor for detecting an abnormal measurement of the first parameter;
    a correlation processor configured for determining a correlation between the abnormal measurement of the first parameter and a value of at least a second avionic parameter to identify a cyberattack; and a reaction module configured for initiating a corrective action in the aircraft as a function of the determined correlation;

wherein the processor for detecting the abnormal measurement of the first parameter prior to determination of the correlation is configured for:

determining a suspect measurement of the first parameter in the onboard system;

comparing the suspect measurement with a redundant measurement of the first parameter in a redundant onboard system at a same or approximate temporal moment, the redundant onboard system being an onboard system redundant with the onboard system;

when the suspect measurement and the redundant measurement are different values, setting aside the suspect measurement from determining the correlation; and when the suspect measurement and the redundant measurement are equal values, retaining the suspect measurement for determining the correlation.

9. An aircraft comprising an onboard system and a system for securing the onboard system according to claim 8.

\* \* \* \* \*